(12) United States Patent
Chen et al.

(10) Patent No.: US 7,049,782 B2
(45) Date of Patent: May 23, 2006

(54) ELECTRICALLY OPERATED DRIVE CONTROLLER, ELECTRICALLY OPERATED DRIVE CONTROL METHOD AND ITS PROGRAM

(75) Inventors: Zhiqian Chen, Aichi-ken (JP); Isao Fujiwara, Aichi-ken (JP)

(73) Assignee: Aisin Aw Co., Ltd., Aichi-ken (JP)

( * ) Notice: Subject to any disclaimer, the term of this patent is extended or adjusted under 35 U.S.C. 154(b) by 0 days.

(21) Appl. No.: 11/148,221

(22) Filed: Jun. 9, 2005

(65) Prior Publication Data
US 2005/0285555 A1    Dec. 29, 2005

(30) Foreign Application Priority Data
Jun. 29, 2004    (JP)    ............................. 2004-190737

(51) Int. Cl.
*G05B 11/36*    (2006.01)
(52) U.S. Cl. .................... 318/609; 318/610; 318/632; 318/432
(58) Field of Classification Search ........ 318/432–434, 318/254, 138, 439, 727, 632, 609, 610
See application file for complete search history.

(56) References Cited

U.S. PATENT DOCUMENTS

| | | | | |
|---|---|---|---|---|
| 5,144,211 A | * | 9/1992 | Daggett et al. | 318/568.11 |
| 5,739,664 A | * | 4/1998 | Deng et al. | 318/808 |
| 6,166,514 A | * | 12/2000 | Ando et al. | 318/811 |
| 6,377,018 B1 | * | 4/2002 | Tajima et al. | 318/727 |
| 6,636,008 B1 | * | 10/2003 | Yamada et al. | 318/254 |
| 6,657,413 B1 | * | 12/2003 | Nakatsugawa et al. | 318/700 |
| 6,850,033 B1 | * | 2/2005 | Gallegos-Lopez et al. | 318/807 |
| 6,924,617 B1 | * | 8/2005 | Schulz et al. | 318/701 |

FOREIGN PATENT DOCUMENTS

JP    05-130710 A    5/1993

* cited by examiner

*Primary Examiner*—Rina Duda
(74) *Attorney, Agent, or Firm*—Sughrue Mion, PLLC

(57) ABSTRACT

An electrically operated drive controller includes first and second electric current command value calculation means which calculate first and second electric current command values based on a target value of torque of an electrically operated machine. The controller also includes a voltage command value calculation processing means which calculates a voltage command value based on the first and second electric current command values and an adjusting value calculation processing means for calculating an adjusting value of the first electric current command value and for performing weak field control based on the voltage command value. The first electric current command value calculation processor adjusts the first electric current command value based on the adjusting value. The second electric current command value calculation processor adjusts the second electric current command value based on the adjusted first electric current command value.

14 Claims, 10 Drawing Sheets

ELECTRICALLY OPERATED DRIVE CONTROLLER, ELECTRICALLY OPERATED DRIVE CONTROL METHOD AND ITS PROGRAM

This application claims priority to Japanese Patent Application JP 2004-190737, filed in the Japanese Patent Office on Jun. 29, 2004, the disclosure of which is incorporated herein by reference.

BACKGROUND OF THE INVENTION

1. Field of the Invention

The present invention relates to an electrically operated drive controller, an electrically operated drive control method and its program.

2. Background Art

A rotor, rotatably arranged and having a magnetic pole pair constructed by a permanent magnet having an N-pole and a S-pole; a stator, arranged format a distance from this rotor in the radial direction and having stator coils of U-phase, V-phase and W-phase, are arranged in a drive motor or in an electric generator arranged as an electrically operated machine.

An electrically operated drive unit is provided to drive the drive motor or the electric generator, and to generate drive motor torque (i.e. torque of the drive motor), or electric generator torque (i.e. torque of the electric generator). A drive motor controller is provided as an electrically operated machine controller to drive the drive motor. An electric generator controller is arranged as an electrically operated machine controller to operate the electric generator. Pulse width modulating signals of the U-phase, the V-phase and the W-phase generated in this electrically operated machine controller are sent to an inverter. A phase electric current generated in this inverter (i.e., the electric currents of the U-phase, the V-phase and the W-phase) are supplied to each of the stator coils. Thus, the drive motor torque and the electric generator torque are generated.

For example, the drive motor controller performs feedback control using a vector control arithmetic operation on a d-q axis model in which a d-axis is set to the direction of the magnetic pole pair in the rotor, and a q-axis is set to the direction perpendicular to this d-axis. Thereby, the drive motor controller detects the electric current supplied to each stator coil, the magnetic pole position of the rotor, a direct current voltage of the inlet of the inverter, etc., and converts the detected electric current (i.e., the detection electric current into a d-axis electric current) and a q-axis electric current on the basis of the magnetic pole position. Subsequently, the drive motor controller calculates a d-axis electric current command value and a q-axis electric current command value which are target values of the d-axis electric current and of the q-axis electric current with reference to an electric current command value map. The drive motor controller further calculates a d-axis voltage command value and a q-axis voltage command value on the basis of the deviation between the d-axis electric current and the d-axis electric current command value, the deviation between the q-axis electric current and the q-axis electric current command value, and parameters of the drive motor.

The d-axis electric current command value and the q-axis electric current command value are recorded to the electric current command value map, corresponding to drive motor target torque, to the direct current voltage and to an angular velocity. The parameters are constructed by a back electromotive voltage constant MIf, a winding resistor Ra of each stator coil, and inductances Ld, Lq, etc. (see JP-A-5-130710).

In the drive motor, back electromotive force is generated as the rotor is rotated. However, as the rotating speed of the drive motor is raised, the terminal voltage of the drive motor is also raised. When this terminal voltage exceeds a threshold value, voltage saturation is generated and output from the drive motor is disabled.

Therefore, when the angular velocity is raised and enters a weak field control area, the electric current command value map is used so as to perform weak field control, and the d-axis electric current command value is increased in the negative direction in a predetermined area of high angular velocity in this electric current command value map. Accordingly, a driving area of the drive motor can be enlarged. (See JP-A-5-130710).

However, in the above-described conventional drive motor controller, when dispersion is generated in the parameter of the drive motor, and the parameter is changed by a temperature change, etc., the d-axis electric current command value and the q-axis electric current command value corresponding to this change cannot be calculated and no weak field control can be stably performed.

SUMMARY OF THE INVENTION

An object of the present invention is to solve the problems of a conventional electrically operated drive controller, and provide an electrically operated drive controller, an electrically operated drive control method, and a program therefor, able to stably perform weak field control even when dispersion is generated in the parameter of an electrically operated machine and the parameter is changed.

An electrically operated drive controller according to a first exemplary embodiment of the present invention includes first and second electric current command value calculation means which calculate first and second electric current command values based on a target value of torque of an electrically operated machine. The controller also includes a voltage command value calculation processing means which calculates a voltage command value based on the first and second electric current command values and an adjusting value calculation processing means for calculating an adjusting value of the first electric current command value and for performing weak field control based on the voltage command value.

The first electric current command value calculation processing means adjusts the first electric current command value based on the adjusting value. The second electric current command value calculation processing means adjusts the second electric current command value based on the adjusted first electric current command value.

According to one exemplary aspect of the present invention, the first electric current command value calculation processing means includes maximum torque control processing means which calculates the first electric current command value in order to minimize the absolute value of an electric current amplitude command value to achieve the target value of the torque of the electrically operated machine. The first electric current command value calculation processing means also includes electric current command value adjustment processing mans which adjusts the first electric current command value calculated by the maximum torque control processing means by the adjusting value.

In another exemplary aspect of the present invention, the second electric current command value calculation processing means calculates the adjusted second electric current command value corresponding to the target value of the torque of the electrically operated machine and the first electric current command value.

According to another exemplary embodiment of the present invention an electrically operated drive controller includes first and second electric current command value calculation processing means for calculating first and second electric current command values, respectively, based on a target value of torque of an electrically operated machine; voltage command value calculation processing means for calculating a voltage command value based on the first and second electric current command values; and adjusting value calculation processing means for calculating an adjusting value of the first electric current command value and for performing weak field control based on the voltage command value.

The first electric current command value calculation processing means includes maximum torque control processing means for calculating the first electric current command value so as to minimize the absolute value of an electric current amplitude command value to achieve the electrically operated machine target torque, and also includes electric current command value adjustment processing means for adjusting the first electric current command value calculated by the maximum torque control processing means by the adjusting value. The second electric current command value calculation processing means calculates the adjusted second electric current command value for achieving the target value of the electrically operated machine torque on the basis of the target value of the electrically operated machine torque and the adjusting value.

In an exemplary aspect of the present invention, the first and second electric current command values are a d-axis electric current command value and a q-axis electric current command value, respectively.

In another exemplary aspect of the present invention, the first and second electric current command values are a q-axis electric current command value and a d-axis electric current command value, respectively.

In another exemplary aspect of the present invention, the adjusting value calculation processing means calculates the adjusting value on the basis of a threshold value and a voltage saturation judging index calculated on the basis of the voltage command value and a voltage saturation judging index showing a degree of voltage saturation.

An exemplary electrically operated drive control method of the present invention includes calculating first and second electric current command values based on a target value of torque of an electrically operated machine; calculating a voltage command value based on the first and second electric current command values; calculating an adjusting value of the first electric current command value; and performing weak field control based on the voltage command value.

The first electric current command value is adjusted based on the adjusting value and the second electric current command value is adjusted based on the first electric current command value.

Another exemplary electrically operated drive control method of the present invention includes calculating first and second electric current command values based on a target value of torque of an electrically operated machine; calculating a voltage command value based on the first and second electric current command values; calculating an adjusting value of the first electric current command value; and performing weak field control based on the voltage command value.

The first and second electric current command values are calculated based on the target value of the torque of the electrically operated machine and the adjusting value in.

An exemplary computer readable medium, according to the present invention, having an electrically operated drive control program adapted to enable a computer to operate an electrically operated drive controller enables the computer to calculate first and second electric current command valued based on a target value of torque of an electrically operated machine. The program further enables the computer to calculate a voltage command value based on the first and second electric current command values, to calculate an adjusting value of the first electric current command value, and to perform weak field control based on the voltage command value. The first electric current command value is adjusted based on the adjusting value and the second electric current command value is adjusted based on the first electric current command value.

BRIEF DESCRIPTION OF THE DRAWINGS

These and other features, aspects, and advantages of the present invention will become better understood with reference to the following description and accompanying drawings, which should not be read to limit the invention in any way, in which.

DETAILED DESCRIPTION OF THE PREFERRED EMBODIMENTS

The exemplary embodiments of the present invention will next be explained in detail with reference to the drawings. In this case, an electrically operated drive unit mounted to an electric automobile (as an electrically operated vehicle), and an electrically operated drive controller for operating this electrically operated drive unit will be explained.

Figure 1:
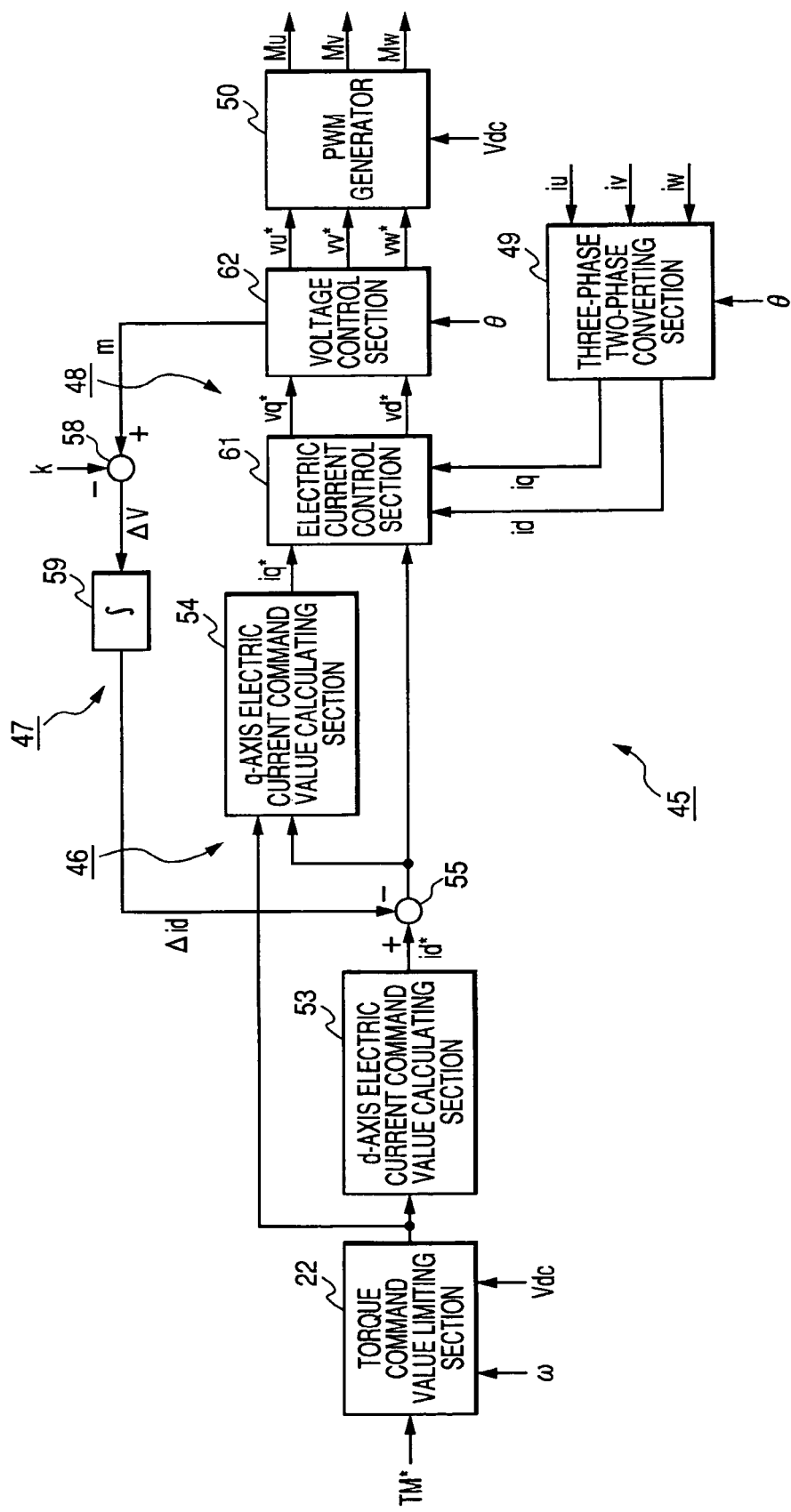
FIG. 1 is a block diagram of a drive motor controller in a first embodiment of the present invention.
Figure 2:
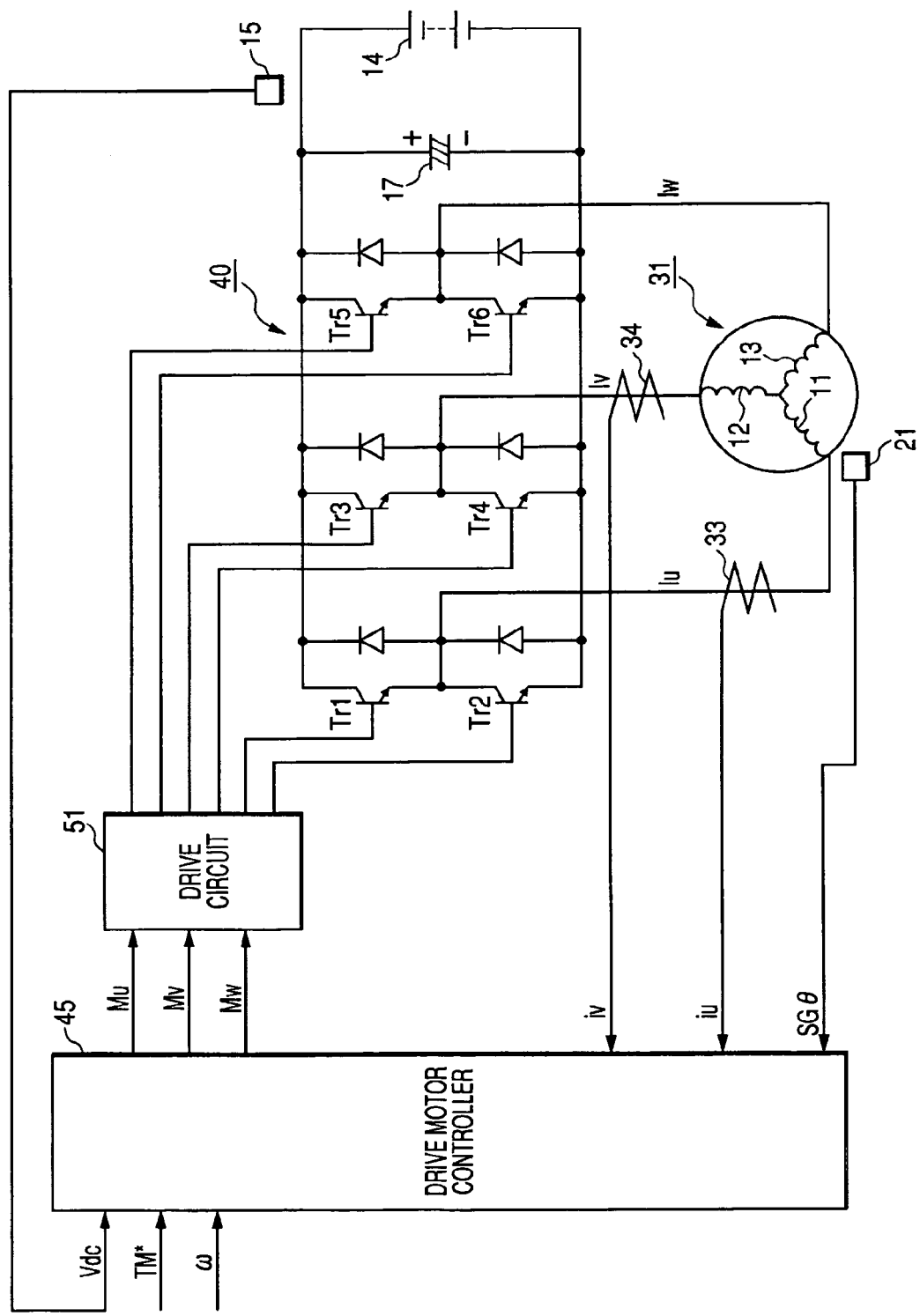
FIG. 2 is a conceptual view of an electrically operated drive controller of the first embodiment of the present invention.
Figure 3:
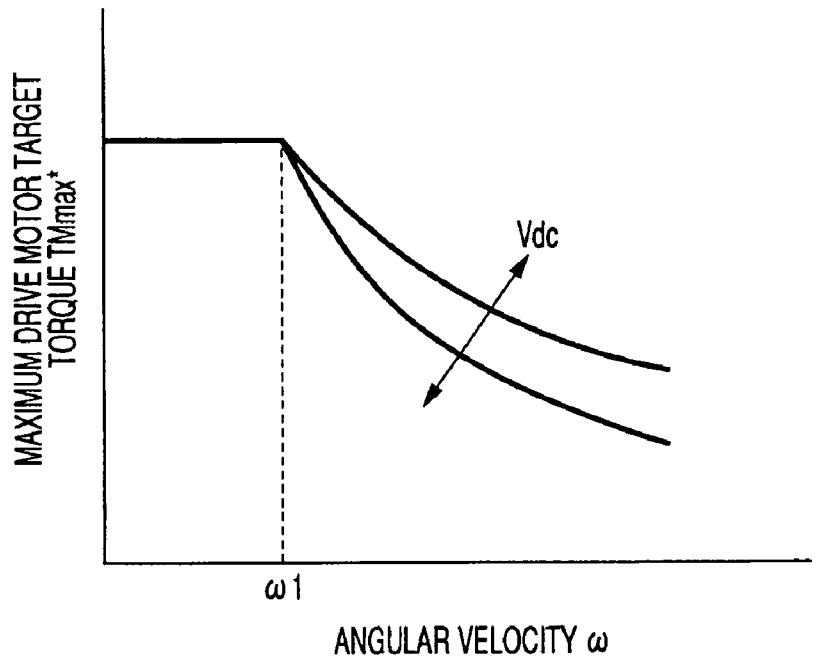
FIG. 3 is a view showing a maximum drive motor target torque map of the first embodiment of the present invention.
Figure 4:
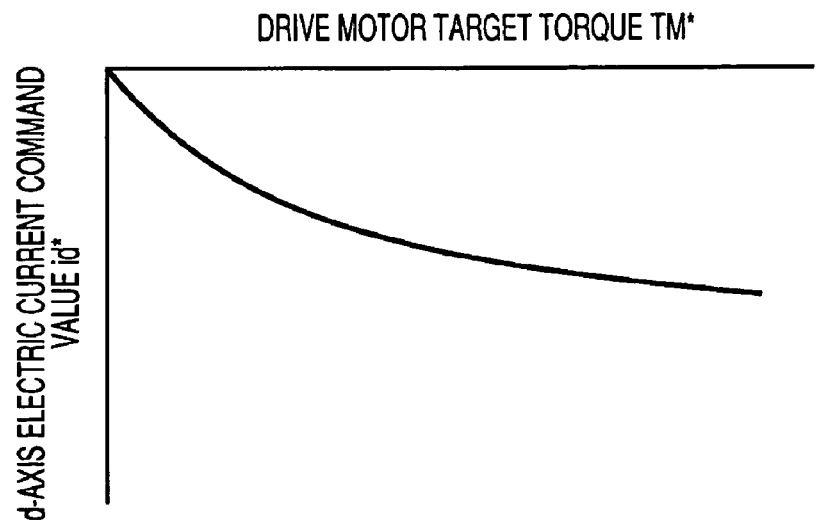
FIG. 4 is a first electric current command value map of the first embodiment of the present invention.
Figure 5:
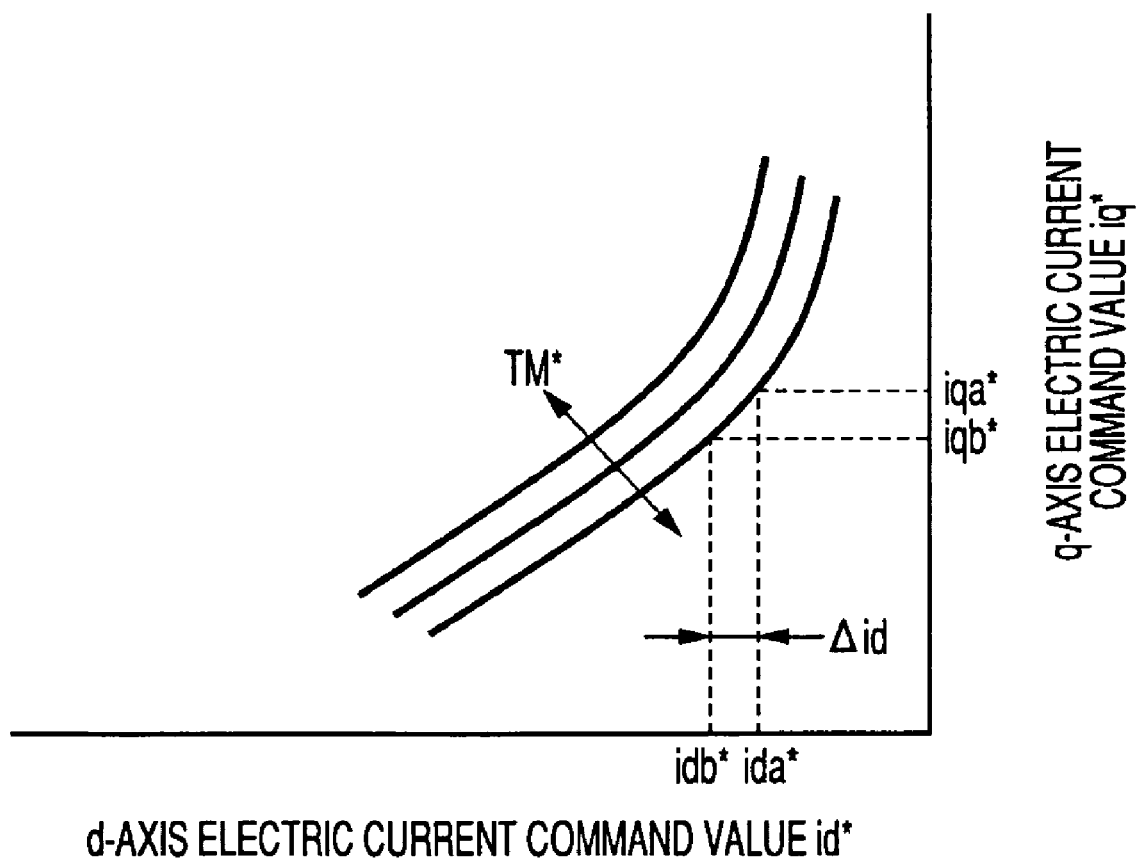
FIG. 5 is a second electric current command value map of the first embodiment of the present invention.

FIG. 1 is a block diagram of a drive motor controller of a first embodiment of the present invention. FIG. 2 is a conceptual view of the electrically operated drive controller of the first embodiment of the present invention. FIG. 3 is a maximum drive motor target torque map of the first embodiment of the present invention. FIG. 4 is a first electric current command value map of the first embodiment of the present invention. FIG. 5 is a second electric current command value map of the first embodiment of the present invention. In FIG. 3, angular velocity ω is measured on the horizontal (x) axis and maximum drive motor target torque TMmax* is measured on the vertical (y) axis. In FIG. 4, drive motor target torque TM* (as torque of a drive motor 31) is measured on the horizontal (x) axis, and a d-axis electric current command value id* is measured on the vertical (y) axis. In FIG. 5, a d-axis electric current command value id* is measured on the horizontal (x) axis, and a q-axis electric current command value iq* is measured on the vertical (y) axis.

In FIG. 2, reference numeral 31 designates a drive motor (an electrically operated machine). The drive motor 31 has an unillustrated rotor which is rotatably arranged and attached to a drive shaft of an electric automobile, and a stator arranged radially outward from the rotor. The rotor has a rotor core, and permanent magnets arranged at an equal pitch in a plurality of positions around the rotor core. The S-pole and the N-pole of the permanent magnet comprise a magnetic pole pair. The stator has a stator core in which teeth are formed so as to project radially inward at a plurality of positions around the stator core. The stator also has stator coils 11, 12, and 13, which are coils of the U-phase, the V-phase and the W-phase, respectively, wound around the teeth of the stator core.

In the output shaft of the rotor, a magnetic pole position sensor 21 is provided to detect the magnetic pole position of the rotor. This magnetic pole position sensor 21 generates a magnetic pole position signal SGθ as a sensor output, and sends this magnetic pole position signal SGθ to a drive motor controller 45, which is an electrically operated machine controller. In this embodiment, a resolver may be used as the magnetic pole position sensor 21.

A direct electric current from a battery 14 is converted into a phase electric current, i.e., electric currents Iu, Iv, Iw of the U-phase, the V-phase and the W-phase, by an inverter 40 acting as an electric current generator to run the electric automobile by driving the drive motor 31. The electric currents Iu, Iv, Iw of the respective phases are respectively supplied to the stator coils 11, 12, and 13.

Therefore, the inverter 40 has transistors Tr1 to Tr6 as six switching elements, and sends a driving signal generated in a drive circuit 51 to each of the transistors Tr1 to Tr6. The electric currents Iu, Iv, Iw of the respective phases can be generated by selectively turning each of the transistors Tr1 to Tr6 on and off. A power module, such as an insulating gate bipolar transistor (IGBT), etc. formed by assembling two to six switching elements into one package, and an Intelligent Power Module (IPM) formed by assembling a drive circuit, etc. into an IGBT, can be used as the inverter 40.

A voltage sensor 15 (as a voltage detecting section) is arranged on the inlet side of the inverter 40. This voltage sensor 15 detects a direct current voltage Vdc of the inlet side of the inverter 40, and sends this direct current voltage Vdc to the drive motor controller 45. A battery voltage can be also used as the direct current voltage Vdc. In this case, a battery voltage sensor may be arranged in the battery 14 as a voltage detecting section.

The electrically operated drive unit includes the drive motor 31, the inverter 40, the drive circuit 51, an unillustrated drive wheel, etc. Reference numeral 17 designates a capacitor.

The stator coils 11 to 13 are star-connected. Accordingly, when the values of the electric currents of two phases among the respective phases are determined, the value of an electric current of the remaining one phase may also be determined. Accordingly, for example, electric current sensors 33 and 34 (as an electric current detecting section for detecting the electric currents Iu, Iv of the U-phase and the V-phase) may be arranged in lead wires of the stator coils 11 and 12 of the U-phase and the V-phase in order to control the electric currents Iu, Iv, Iw of the respective phases. The electric current sensors 33 and 34 send the detected electric currents iu and iv to the drive motor controller 45.

An unillustrated memory such as RAM, ROM, etc., for recording data and various kinds of programs, and an unillustrated CPU, functioning as a computer, are provided in the drive motor controller 45. First and second electric current command value maps are recorded in the memory. A microprocessor unit (MPU) can be used instead of a CPU.

Various kinds of programs, data, etc. are recorded in the memory, but can be also recorded to another recording medium, such as a hard disk, etc., provided as an external memory device, etc. In this case, for example, a flash memory may be provided in the drive motor controller 45, and the programs, data, etc. may be read from the memory and recorded to the flash memory. Accordingly, the programs, data, etc. can be updated by exchanging an external recording medium. As described above, according to one embodiment, a computer readable medium, having an electrically operated drive control program is adapted to enable a computer to operate the electrically operated drive controller 45.

The operation of the drive motor controller 45 will next be explained.

First, an unillustrated position detection processing means of the drive motor controller 45 performs position detection processing by reading the magnetic pole position signal SGθ sent from the magnetic pole position sensor 21, and determining the magnetic pole position θ on the basis of this magnetic pole position signal SGθ. Further, a rotating speed calculation processing means of the position detection processing means performs rotating speed calculation processing by calculating the angular velocity ω of the drive motor 31 from the magnetic pole position signal SGθ. The rotating speed calculation processing means also calculates a drive motor rotating speed NM which is the rotating speed of the drive motor 31 on the basis of the angular velocity ω when the number of magnetic poles is set to p:

$$NM=60\times(2/p)\times\omega/2\pi$$

An electrically operated machine rotating speed is calculated based on the drive motor rotating speed NM.

An unillustrated detection electric current acquisition processing means of the drive motor controller 45 performs detection electric current acquisition processing by reading and obtaining the detection electric currents iu and iv. The detection electric current acquisition processing means calculates this detection electric current iw on the basis of the detection electric currents iu and iv:

$$iw=-iu-iv.$$

Next, an unillustrated drive motor control processing means of the drive motor controller 45 performs drive motor control processing, thereby driving the drive motor 31 on the basis of the drive motor target torque TM*, the detection electric currents iu, iv, iw, the magnetic pole position θ, and the direct current voltage Vdc, etc. Electrically operated machine torque is calculated based on the drive motor torque TM, and electrically operated machine target torque is calculated based on the drive motor target torque TM*.

Thereby, an unillustrated vehicle speed detection processing means of the drive motor controller 45 performs vehicle speed detection processing. The vehicle speed detection processing means detects a vehicle speed V, corresponding to the drive motor rotating speed NM, on the basis of the drive motor rotating speed NM, and sends the detected vehicle speed V to an unillustrated vehicle controller for controlling the entire operation of an electric automobile. A command value calculation processing means for a vehicle in the vehicle controller performs command value calculation processing for a vehicle. It reads the vehicle speed V and an accelerator aperture α and calculates vehicle request torque TO* on the basis of the vehicle speed V and the accelerator aperture α. The command value calculation processing means for a vehicle further generates drive motor target torque TM*, which corresponds to this vehicle request torque TO*, and sends this drive motor target torque TM* to the drive motor controller 45.

In the drive motor controller 45, the drive motor control processing means includes an electric current command value calculating section 46 (as an electric current command value calculation processing means), a weak field control processing section 47 (as a weak field control processing means), a voltage command value calculation processing section 48 (as a voltage command value calculation processing means), a three-phase/two-phase converting section 49 (as a first phase conversion processing means), and a PWM generator 50 (as an output signal generation processing means) to drive the drive motor 31 on the basis of the drive motor target torque TM*.

The electric current command value calculating section 46 has a d-axis electric current command value calculating section 53 and a subtracter 55 (as a first electric current command value calculation processing means), and a q-axis electric current command value calculating section 54 (as a second electric current command value calculation processing means) to perform electric current command value calculation processing. The d-axis electric current command value calculating section 53 and the subtracter 55 perform first electric current command value calculation processing. They calculate a d-axis electric current command value id* (as a first electric current command value), which is a target value of a d-axis electric current id. The q-axis electric current command value calculating section 54 performs second electric current command value calculation processing. It calculates a q-axis electric current command value iq* (as a second electric current command value), which is a target value of a q-axis electric current iq. A maximum torque control processing means includes the d-axis electric current command value calculating section 53, and an electric current command value adjustment processing means includes the subtracter 55.

The weak field control processing section 47 has a subtracter 58 (as a voltage saturation calculating value calculation processing means), and an integrator 59 (as a voltage saturation judgment processing means and an adjusting value calculation processing means). The weak field control processing section 47 performs weak field control processing, and automatically performs the weak field control when a battery voltage is reduced and the drive motor rotating speed NM is raised.

The voltage command value calculation processing section 48 has an electric current control section 61 (as an electric current control processing means) and a voltage control section 62 (as a voltage control processing means) to perform voltage command value calculation processing. On the basis of the d-axis electric current command value id* and the q-axis electric current command value iq*, the electric current control section 61 performs electric current control processing. The electric current control section 61 calculates a d-axis voltage command value vd* and a q-axis voltage command value vq* as first and second axis voltage command values. The voltage control section 62 performs voltage control processing, and calculates voltage command values vu*, vv*, vw* as first to third phase voltage command values. The voltage command values comprise the d-axis voltage command value vd*, the q-axis voltage command value vq*, and the voltage command values vu*, vv*, vw*.

In this embodiment, the drive motor controller 45 performs feedback control using a vector control arithmetic operation on a d-q axis model in which the d-axis is set to the direction of a magnetic pole pair in the rotor and the q-axis is set to the direction perpendicular to the d-axis.

The electric current command value calculating section 46 performs electric current command value calculation processing. It reads the drive motor target torque TM*, the angular velocity ω and the direct current voltage Vdc, and calculates the d-axis electric current command value id* and the q-axis electric current command value iq, which are target values of the d-axis electric current id and the q-axis electric current iq.

Therefore, when the drive motor target torque TM* is sent from the command value calculation processing means for a vehicle to the drive motor controller 45, a torque command value limiting section 22 (as a torque command value limit processing means of the drive motor controller 45) performs torque command value limit processing. It reads the direct current voltage Vdc, the angular velocity ω and the drive motor target torque TM*. With reference to the maximum drive motor target torque map of FIG. 3, recorded in the memory, the torque command value limiting section 22 also reads maximum drive motor target torque TMmax* (a maximum value of the drive motor target torque TM* corresponding to the direct current voltage Vdc and the angular velocity ω. The torque command value limiting section 22 further limits the drive motor target torque TM* so as not to exceed the maximum drive motor target torque TMmax*. A maximum electrically operated machine target torque map is constructed based on the maximum drive motor target torque map, and maximum electrically operated machine target torque is calculated based on the maximum drive motor target torque TMmax*.

When the angular velocity ω is a predetermined value of ω1 or less in the drive motor target torque map of FIG. 3, the maximum drive motor target torque TMmax* has a constant value. In contrast to this, when the angular velocity ω exceeds the predetermined value ω1, the maximum drive motor target torque TMmax* is reduced in a curve shape. In an area in which the angular velocity ω exceeds the predetermined value ω1, the maximum drive motor target torque TMmax* increases as the direct current voltage Vdc is raised, and decreases as the direct current voltage Vdc is lowered.

Subsequently, the d-axis electric current command value calculating section 53 performs maximum torque control processing, and receives the drive motor target torque TM* limited in the torque command value limiting section 22. With reference to the first electric current command value map of FIG. 4 recorded in the memory, the d-axis electric current command value calculating section 53 reads the d-axis electric current command value id* corresponding to the drive motor target torque TM*, and sends this d-axis electric current command value id* to the subtracter 55.

In this case, in the first electric current command value map of FIG. 4, the d-axis electric current command value id* is set such that the absolute value of an electric current amplitude command value is minimized to achieve the drive motor target torque TM*. In the first electric current command value map, the drive motor target torque TM* has a positive value, but the d-axis electric current command value id* has a negative value. When the drive motor target torque TM* is zero (0), the d-axis electric current command value id* is also zero. As the drive motor target torque TM* is increased, the d-axis electric current command value id* is decreased (made more negative).

In the drive motor 31, back electromotive force is generated as the rotor is rotated. However, as the drive motor rotating speed NM is raised, the terminal voltage of the drive motor 31 is raised. When this terminal voltage exceeds a threshold value, voltage saturation is generated and an output using the drive motor 31 is disabled.

Therefore, an unillustrated voltage saturation judging index calculation processing means of the voltage control section 62 performs voltage saturation judging index calculation processing, and calculates a voltage saturation judging index m:

$$m = \sqrt{(vd^{*2} + vq^{*2})}/Vdc$$

(as a value showing a degree of the voltage saturation) on the basis of the d-axis voltage command value vd* and the q-axis voltage command value vq*, and sends the voltage saturation judging index m to the subtracter 58.

The subtracter 58 performs voltage saturation calculating value calculation processing. It subtracts a constant k (0.78 in this embodiment) from the voltage saturation judging index m when a threshold value showing a maximum output voltage of the inverter 40 is set to a comparison value Vmax:

$$V\max = k \times Vdc.$$

The subtracter 58 further calculates a voltage saturation calculating value ΔV $$\Delta V = m - k$$

and sends this voltage saturation calculating value ΔV to the integrator 59.

Subsequently, the integrator 59 performs voltage saturation judgment processing and adjusting value calculation processing. It integrates the voltage saturation calculating value ΔV every control timing, and calculates an integrating value ΣΔV. When this integrating value ΣΔV has a positive value, the integrator 59 multiplies the integrating value ΣΔV by a proportional constant, calculates an adjusting value Σid for performing the weak field control, and sets this adjusting value Σid to a positive value. When the voltage saturation calculating value ΔV or the integrating value ΣΔV has a value of zero or less, the integrator 59 sets the adjusting value Δid to zero.

The subtracter 55 performs electric current command value adjustment processing. It receives the adjusting value Δid and adjusts the d-axis electric current command value id* by subtracting the adjusting value Δid from the d-axis electric current command value id*. The subtracter 55 then sends the adjusted d-axis electric current command value id* to the q-axis electric current command value calculating section 54 and to the electric current control section 61.

In this case, when the adjusting value Δid has a value of zero, the d-axis electric current command value id* is not adjusted and the weak field control is not performed. In contrast to this, when the adjusting value Δid has a positive value, the d-axis electric current command value id* is adjusted and is increased in the negative direction and the weak field control is performed.

Thus, when the d-axis electric current command value id* is calculated, the q-axis electric current command value calculating section 54 reads the drive motor target torque TM* limited in the torque command value limiting section 22 and the d-axis electric current command value id*. With reference to the second electric current command value map of FIG. 5 recorded in the memory, the q-axis electric current command value calculating section 54 calculates the q-axis electric current command value iq* corresponding to the drive motor target torque TM* and the d-axis electric current command value id*, and sends this q-axis electric current command value iq* to the electric current control section 61.

In the second electric current command value map of FIG. 5, the d-axis electric current command value id* decreases (becomes more negative) and the q-axis electric current command value iq* increases as the drive motor target torque TM* is increased. As the drive motor target torque TM* is reduced, the d-axis electric current command value id* increases (becomes less negative) and the q-axis electric current command value iq* decreases. Further, when the drive motor target torque TM* is constant and the d-axis electric current command value id* decreases (becomes more negative), the q-axis electric current command value iq* decreases.

Accordingly, when the adjusting value Δid is zero and the weak field control is not performed and the value of the d-axis electric current command value id* sent to the subtracter 55 is ida*, as shown in e.g., FIG. 5, the d-axis electric current command value id* is sent to the q-axis electric current command value calculating section 54 as the value ida* without adjusting since the adjusting value Δid is zero. In the q-axis electric current command value calculating section 54, the value of the q-axis electric current command value iq* becomes iqa*. In contrast to this, when the adjusting value Δid has a positive value and the weak field control is performed (e.g., when the value of the d-axis electric current command value id* sent to the subtracter 55 is ida*), the d-axis electric current command value id* is set to a value idb*, which is less than ida* by an amount Δid in the subtracter 55 and is sent to the q-axis electric current command value calculating section 54. In the q-axis electric current command value calculating section 54, the q-axis electric current command value iq* is set as iqb*, which is less than the value iqa*.

The three-phase/two-phase converting section 49 performs three-phase/two-phase conversion as first phase conversion processing, and reads the magnetic pole position θ and respectively converts the detection electric currents iu, iv, iw into the d-axis electric current id and the q-axis electric current iq. The three-phase/two-phase converting section 49 further calculates the d-axis electric current id and the q-axis electric current iq as the actual electric currents, and sends the d-axis electric current id and the q-axis electric current iq to the electric current control section 61. The electric current control section 61 performs feedback control when the electric current control section 61 receives the d-axis electric current command value id* and the q-axis electric current command value iq* after the weak field control processing from the subtracter 55 and the q-axis electric current command value calculating section 54, and also receives the d-axis electric current id and the q-axis electric current iq from the three-phase/two-phase converting section 49.

Therefore, the electric current control section 61 calculates the electric current deviation δid between the d-axis electric current command value id* and the d-axis electric current id, and the electric current deviation δiq between the q-axis electric current command value iq* and the q-axis electric current iq. The electric current control section 61 further perform proportional control and integral control on the basis of each of the electric current deviations δid and δiq.

Namely, the electric current control section 61 calculates a voltage drop Vzdp, which is a voltage command value of a proportional component on the basis of the electric current deviation δid, and a voltage drop Vzdi, which is a voltage command value of an integral component. The electric current control section 61 further adds the voltage drops Vzdp, Vzdi and calculates a voltage drop Vzd:

$$Vzd = Vzdp + Vzdi.$$

Further, the electric current control section 61 reads the angular velocity ω and the q-axis electric current iq, and calculates an induced voltage ed:

$$ed = \omega \times Lq \times iq$$

induced by the q-axis electric current iq, on the basis of the angular velocity ω, the q-axis electric current iq and q-axis inductance Lq. The electric current control section 61 further subtracts the induced voltage ed from the voltage drop Vzd, and calculates a d-axis voltage command value vd* as an output voltage:

$$vd^* = Vzd - ed$$
$$= Vzd - \omega \times Lq \times iq.$$

Further, the electric current control section 61 calculates a voltage drop Vzqp, which is a voltage command value of the proportional component on the basis of the electric current deviation δiq, and calculates a voltage drop Vzqi, which is a voltage command value of the integral term component. The electric current control section 61 further adds the voltage drops Vzqp, Vzqi and calculates a voltage drop Vzq:

$$Vzq = Vzqp + Vzqi.$$

Further, the electric current control section 61 reads the angular velocity ω and the d-axis electric current id, and calculates an induced voltage eq:

$$eq = \omega(MIf = Ld \times id)$$

induced by the d-axis electric current id on the basis of the angular velocity ω, a back electromotive voltage constant MIf, the d-axis electric current id and inductance Ld on the d-axis. The electric current control section 61 also adds the induced voltage eq to the voltage drop Vzq and calculates a q-axis voltage command value vq* as an output voltage:

$$vq^* = Vzq = eq$$
$$= Vzq + \omega(Mif + Ld \times id).$$

Subsequently, a two-phase/three-phase converting section (an unillustrated second phase conversion processing means of the voltage control section 62) performs second phase conversion processing, and reads the d-axis voltage command value vd*, the q-axis voltage command value vq* and the magnetic pole position θ. The two-phase/three-phase converting section also converts the d-axis voltage command value vd* and the q-axis voltage command value vq* into voltage command values vu*, vv*, vw*, and sends these voltage command values vu*, vv*, vw* to the PWM generator 50.

The PWM generator 50 performs output signal generation processing, and generates pulse width modulating signals Mu, Mv, Mw of the respective phases having pulse widths corresponding to the d-axis electric current command value id* and the q-axis electric current command value iq* as output signals on the basis of the voltage command values vu*, vv*, vw* of the respective phases and the direct current voltage Vdc. The PWM generator 50 then sends these pulse width modulating signals Mu, Mv, Mw to the drive circuit 51.

The drive circuit 51 receives the pulse width modulating signals Mu, Mv, Mw of the respective phases and generates six driving signals and sends these six driving signals to the inverter 40. The inverter 40 generates electric currents Iu, Iv, Iw of the respective phases by switching transistors Tr1 to Tr6 on the basis of the pulse width modulating signals Mu, Mv, Mw, and supplies the electric currents Iu, Iv, Iw of the respective phases to the respective stator coils 11 to 13 of the drive motor 31.

Thus, the torque control is performed on the basis of the drive motor target torque TM*, and the electric automobile runs by driving the drive motor 31.

In this embodiment, the voltage saturation judging index m is calculated on the basis of the d-axis voltage command value vd* and the q-axis voltage command value vq* sent from the electric current control section 61, and the adjusting value Δid is calculated on the basis of the voltage saturation judging index m and the weak field control is performed. Accordingly, even when dispersion is generated in parameters of the drive motor 31 such as the back electromotive voltage constant MIf, the winding resistor Ra of each of the stator coils 11 to 13, the inductances Ld, Lq, etc., and the parameters are changed by a temperature change, etc., the d-axis voltage command value vd* and the q-axis voltage command value vq* are calculated correspondingly to this change and the voltage saturation judging index m and the adjusting value Δid are calculated. Accordingly, the d-axis electric current command value id* and the q-axis electric current command value iq* can be also calculated correspondingly to the changes of the parameters. Accordingly, the weak field control can be stably performed, and the accuracy of the torque control can be improved.

Next, a second embodiment of the present invention will be explained. Elements having the same structures as the first embodiment are designated by the same reference numerals, and their explanations are omitted. With respect to effects of the invention obtained by arranging the same structures, the effects of the first embodiment are quoted.

Figure 6:
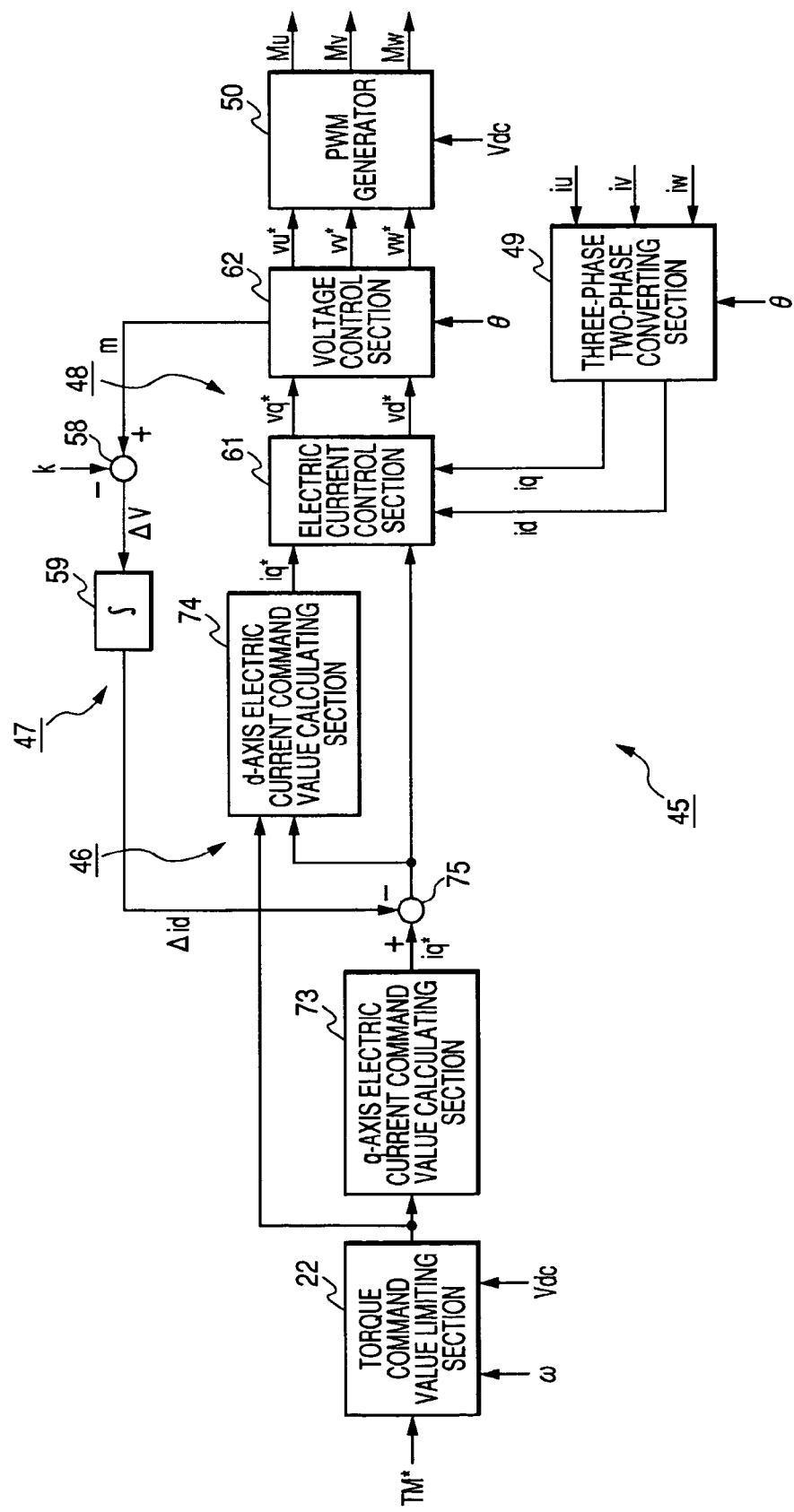
FIG. 6 is a block diagram of a drive motor controller of a second embodiment of the present invention.
Figure 7:
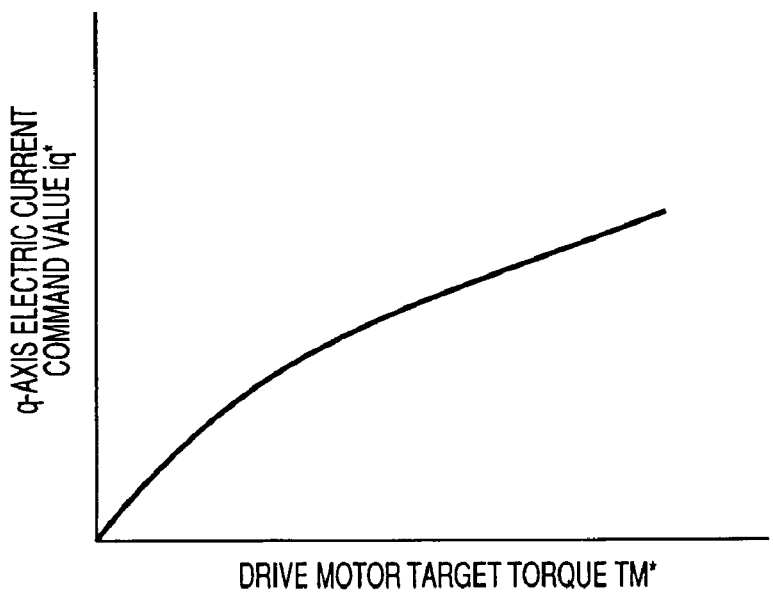
FIG. 7 is a first electric current command value map of the second embodiment of the present invention.
Figure 8:
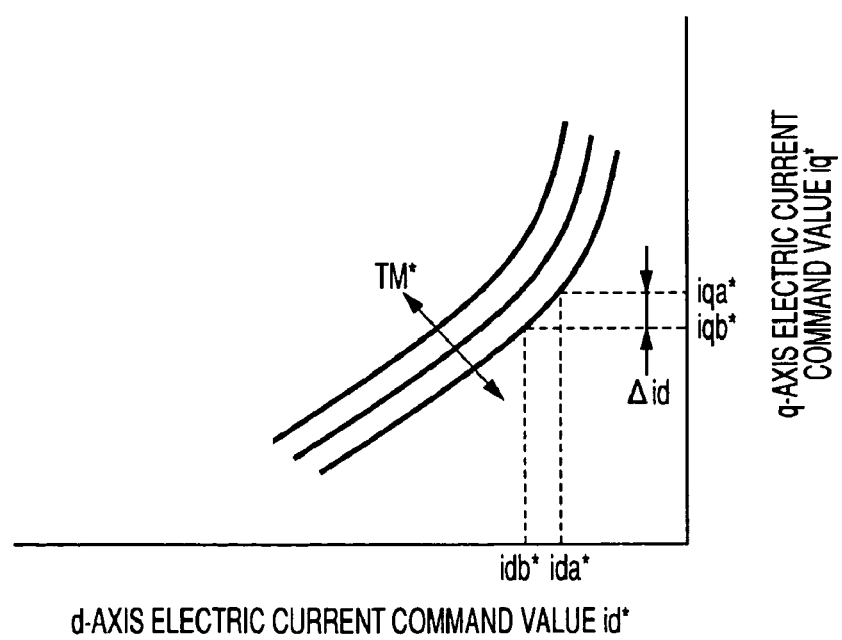
FIG. 8 is a second electric current command value map of the second embodiment of the present invention.

FIG. 6 is a block diagram of a drive motor controller of the second embodiment of the present invention. FIG. 7 is a first electric current command value map of the second embodiment of the present invention. FIG. 8 is a a second electric current command value map of the second embodiment of the present invention. In FIG. 7, the drive motor target torque TM* is measured on the horizontal (x) axis and the q-axis electric current command value iq* is measured on the vertical (y) axis. In FIG. 8, the d-axis electric current command value id* is measured on the horizontal (x) axis and the q-axis electric current command value iq* is measured on the vertical (y) axis.

In this case, the electric current command value calculating section 46 (as an electric current command value calculation processing means) has a q-axis electric current command value calculating section 73 (as a first electric current command value calculation processing means), a subtracter 75 and a d-axis electric current command value calculating section 74 (as a second electric current command value calculation processing means), to perform electric current command value calculation processing. The q-axis electric current command value calculating section 73 and the subtracter 75 performs first electric current command value calculation processing, and calculate the q-axis electric current command value iq* as a first electric current command value. The d-axis electric current command value calculating section 74 performs second electric current command value calculation processing and calculates the d-axis electric current command value id* as a second electric current command value. A maximum torque control processing means includes the q-axis electric current command value calculating section 73, and an electric current command value adjustment processing means includes the subtracter 75.

The q-axis electric current command value calculating section 73 performs maximum torque control processing. With reference to the first electric current command value map of FIG. 7 recorded in the memory, the q-axis electric current command value calculating section 73 reads the q-axis electric current command value iq*, corresponding to the drive motor target torque TM*, and sends this q-axis electric current command value iq* to the subtracter 75.

In this case, in the first electric current command value map of FIG. 7, the q-axis electric current command value iq* is set such that the absolute value of an electric current amplitude command value is minimized to achieve the drive motor target torque TM*. In the first electric current command value map, the drive motor target torque TM* and the q-axis electric current command value iq* have positive values. When the drive motor target torque TM* is zero, the q-axis electric current command value iq* is set to zero. As the drive motor target torque TM* is increased, the q-axis electric current command value iq* also increases.

The voltage saturation judging index calculation processing means of the voltage control section 62 performs voltage saturation judging index calculation processing, and calculates the voltage saturation judging index m similarly to the first embodiment on the basis of the d-axis voltage command value vd* and the q-axis voltage command value vq*. The voltage saturation judging index calculation processing means then sends this voltage saturation judging index m to the subtracter 58 (as a voltage saturation calculating value calculation processing means).

This subtracter 58 performs voltage saturation calculating value calculation processing and subtracts a constant k from the voltage saturation judging index m, and calculates a voltage saturation calculating value $\Delta V$. The subtracter 58 then sends the voltage saturation calculating value $\Delta V$ to the integrator 59 (as a voltage saturation judgment processing means and an adjusting value calculation processing means).

Subsequently, the integrator 59 performs voltage saturation judgment processing and adjusting value calculation processing, and integrates the voltage saturation calculating value $\Delta V$ every control timing, and calculates an integrating value $\Sigma \Delta V$. When this integrating value $\Sigma \Delta V$ has a positive value, the integrator 59 multiplies this integrating value $\Sigma \Delta V$ by a proportional constant, calculates the adjusting value $\Delta iq$ for performing the weak field control, and sets the adjusting value $\Delta iq$ to a positive value. When the voltage saturation calculating value $\Delta V$ or the integrating value $\Sigma \Delta V$ has a value of zero or less, the integrator 59 sets the adjusting value $\Delta iq$ to zero.

The subtracter 75 performs electric current command value adjustment processing. It receives the adjusting value $\Delta iq$, and adjusts the q-axis electric current command value iq* by subtracting the adjusting value $\Delta iq$ from the q-axis electric current command value iq*. The subtracter 75 then sends the adjusted q-axis electric current command value iq* to the d-axis electric current command value calculating section 74 and to the electric current control section 61.

In this case, when the adjusting value $\Delta iq$ has a value of zero, the q-axis electric current command value iq* is not adjusted and the weak field control is not performed. In contrast to this, when the adjusting value $\Delta iq$ has a positive value, the q-axis electric current command value iq* is decreased, and the weak field control is performed.

Thus, when the q-axis electric current command value iq* is calculated, the d-axis electric current command value calculating section 74 reads the drive motor target torque TM*, limited by the torque command value limiting section 22, and the q-axis electric current command value iq*. With reference to the second electric current command value map of FIG. 8 recorded in the memory, the d-axis electric current command value calculating section 74 calculates the d-axis electric current command value id* corresponding to the drive motor target torque TM* and the q-axis electric current command value iq*, and sends this d-axis electric current command value id* to the electric current control section 61.

When the adjusting value $\Delta iq$ is zero and the weak field control is not performed and the value of the q-axis electric current command value iq* sent to the subtracter 75 is iqa* as shown in FIG. 8, the q-axis electric current command value iq* is sent to the d-axis electric current command value calculating section 74 as the value iqa* without adjusting since the adjusting value $\Delta iq$ is zero. In the d-axis electric current command value calculating section 74, the value of the d-axis electric current command value id* becomes ida*. In contrast to this, when the adjusting value $\Delta iq$ has a positive value and the weak field control is performed (e.g., when the value of the q-axis electric current command value iq* sent to the subtracter 75 is iqa*), the q-axis electric current command value iq* is set to a value iqb* in the subtracter 75, which is less than iqa* by a value $\Delta iq$ and is sent to the d-axis electric current command value calculating section 74. In this d-axis electric current command value calculating section 74, the d-axis electric current command value id* is decreased (made more negative) from the value ida* to a value idb*.

Next, a third embodiment of the present invention will be explained. Elements having the same structures as the first embodiment are designated by the same reference numerals, and their explanations are omitted. With respect to effects of the invention obtained by arranging the same structures, the effects of the first embodiment are quoted.

Figure 9:
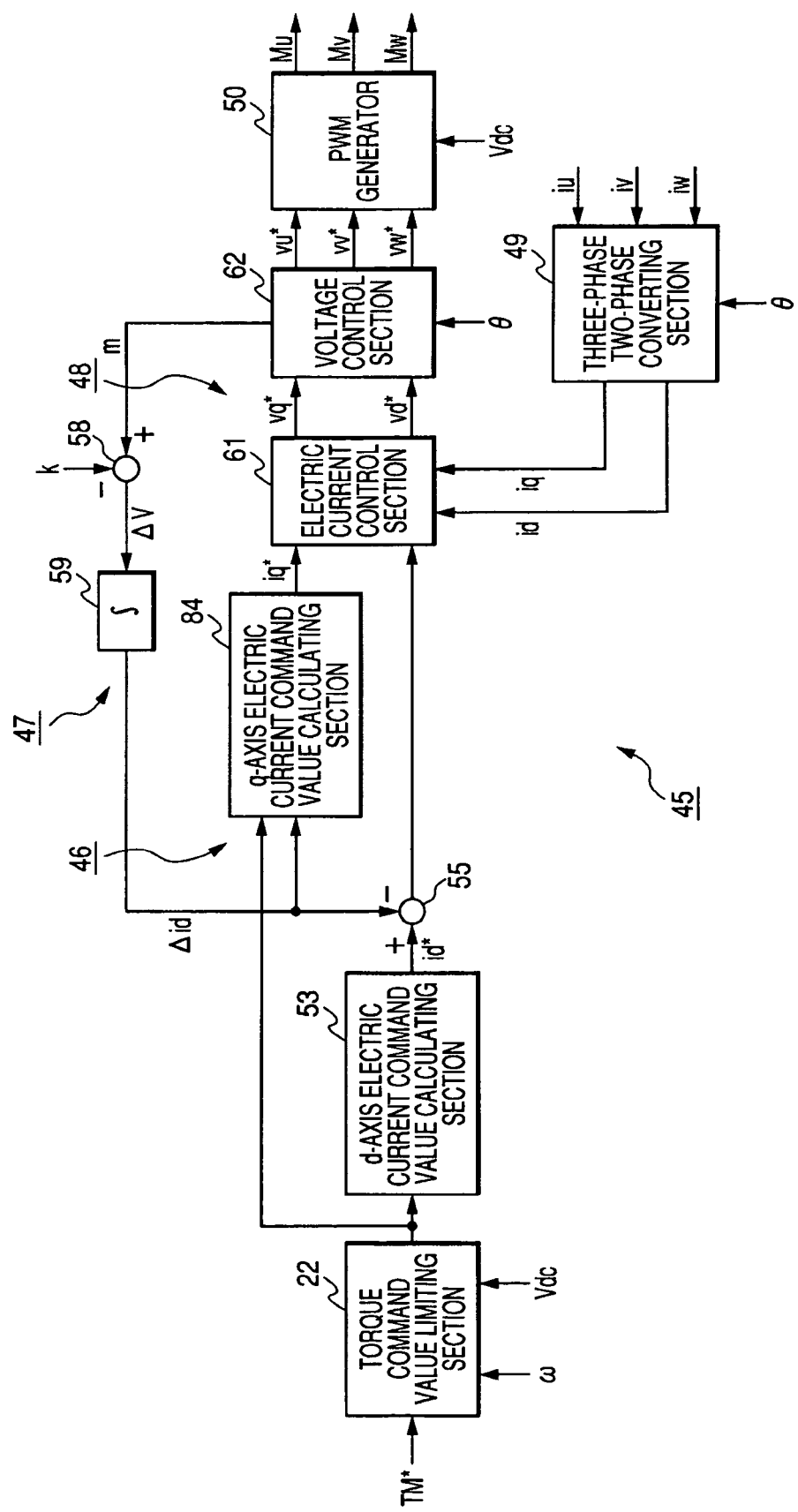
FIG. 9 is a block diagram of a drive motor controller of a third embodiment of the present invention.
Figure 10:
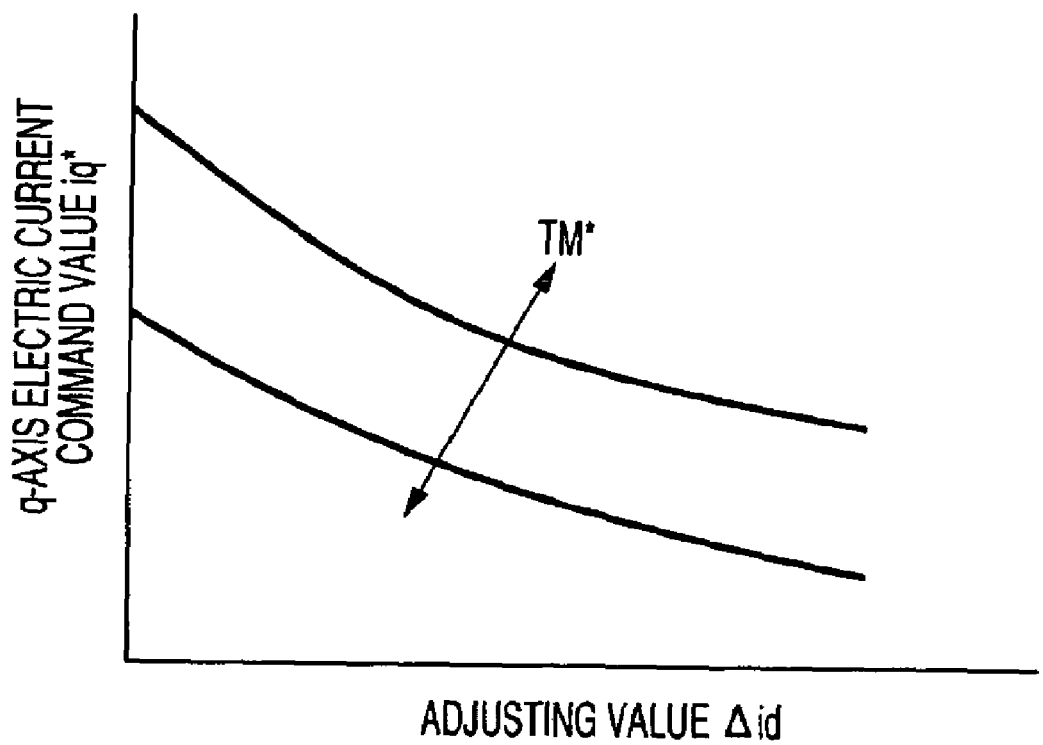
FIG. 10 is a second electric current command value map of the third embodiment of the present invention.

FIG. 9 is a block diagram of a drive motor controller of the third embodiment of the present invention. FIG. 10 is a second electric current command value map of the third embodiment of the present invention. In FIG. 10, the adjusting value $\Delta id$ is measured on the horizontal (x) axis, and the q-axis electric current command value iq* is measured on the vertical (y).

In this case, the electric current command value calculating section 46 (as an electric current command value calculation processing means) has a d-axis electric current command value calculating section 53 and a subtracter 55 (as a first electric current command value calculation processing means), and a q-axis electric current command value calculating section 84 (as a second electric current command value calculation processing means) to perform electric current command value calculation processing. The d-axis electric current command value calculating section 53 and the subtracter 55 perform first electric current command value calculation processing. They calculate the d-axis electric current command value id* (as a first electric current command value). The q-axis electric current command value calculating section 84 performs second electric current command value calculation processing. It calculates the q-axis electric current command value iq* (as a second electric current command value). A maximum torque control processing means includes the d-axis electric current command value calculating section 53, and an electric current command value adjustment processing means includes the subtracter 55.

The d-axis electric current command value calculating section 53 performs maximum torque control processing. It refers to a first electric current command value map similar to that of FIG. 4 set to the recorder, and reads the d-axis electric current command value id* corresponding to the drive motor target torque TM*. The d-axis electric current command value calculating section 53 then sends this d-axis electric current command value id* to the subtracter 55.

The subtracter 55 performs electric current command value adjustment processing. It receives the adjusting value Δid, calculated similarly to the first embodiment, and adjusts the d-axis electric current command value id* by subtracting the adjusting value Δid from the d-axis electric current command value id*. The subtracter 55 then sends the adjusted d-axis electric current command value id* to the electric current control section 61.

In this case, when the adjusting value Δid has a value of zero, the d-axis electric current command value id* is not adjusted and the weak field control is not performed. In contrast to this, when the adjusting value Δid has a positive value, the d-axis electric current command value id* is decreased (made more negative), and the weak field control is performed.

On the other hand, an unillustrated command value calculation processing means of the q-axis electric current command value calculating section 84 performs command value calculation processing, and reads the drive motor target torque TM*, limited by the torque command value limiting section 22, and the adjusting value Δid. With reference to the second electric current command value map of FIG. 10 recorded in the memory, the command value calculation processing means reads the q-axis electric current command value iq* corresponding to the drive motor target torque TM* and the adjusting value Δid, and sends this q-axis electric current command value iq* to the electric current control section 61. In the second electric current command value map of FIG. 10, the q-axis electric current command value iq* increases as the adjusting value Δid is reduced and the drive motor target torque TM* is increased. The q-axis electric current command value iq* decreases as the adjusting value Δid is increased and the drive motor target torque TM* is reduced.

Next, a fourth embodiment of the present invention will be explained. Elements having the same structures as the second embodiment are designated by the same reference numerals, and their explanations are omitted. With respect to effects of the invention obtained by arranging the same structures, the effects of the second embodiment are quoted.

Figure 11:
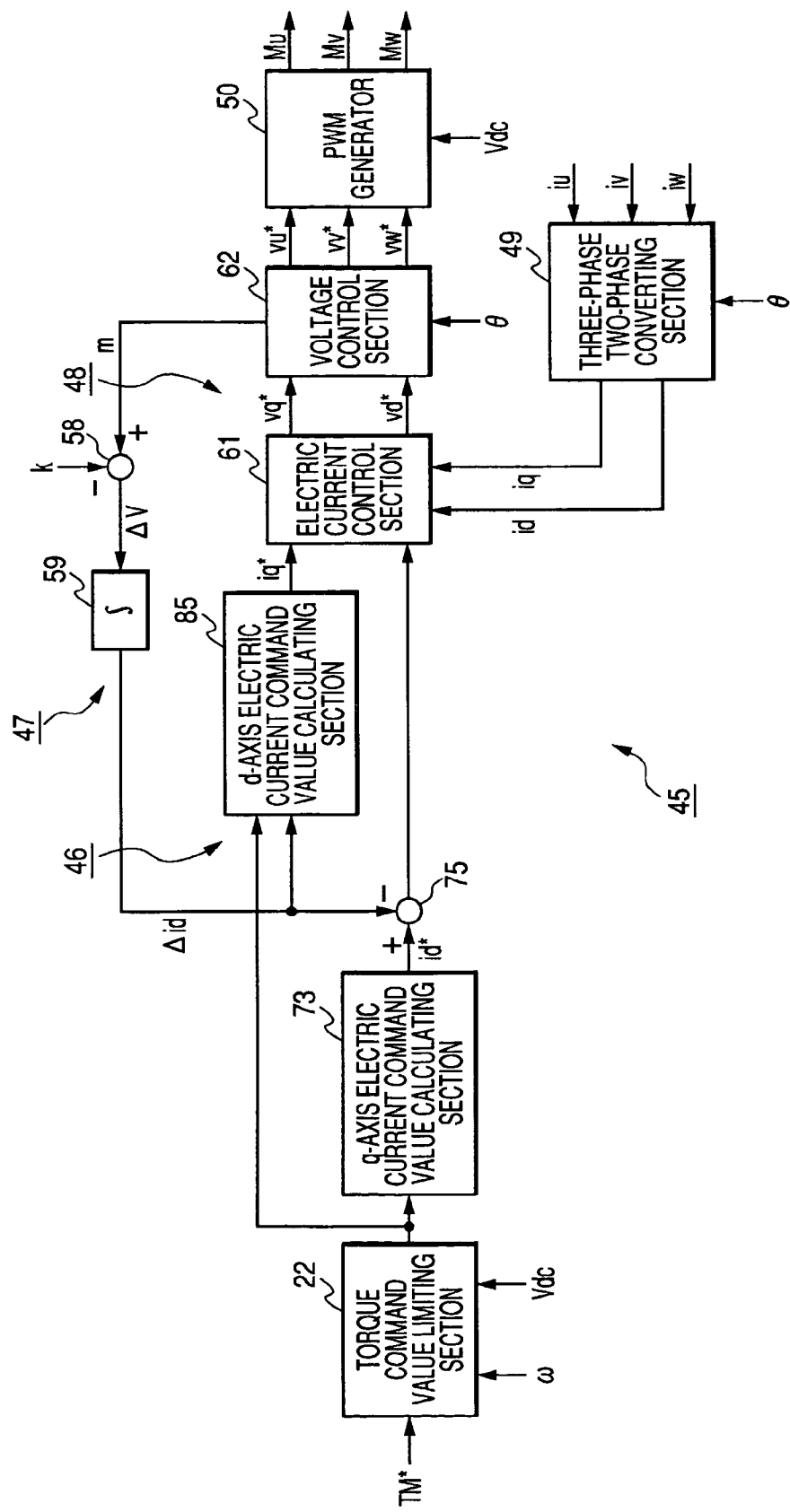
FIG. 11 is a block diagram of a drive motor controller of a fourth embodiment of the present invention.
Figure 12:
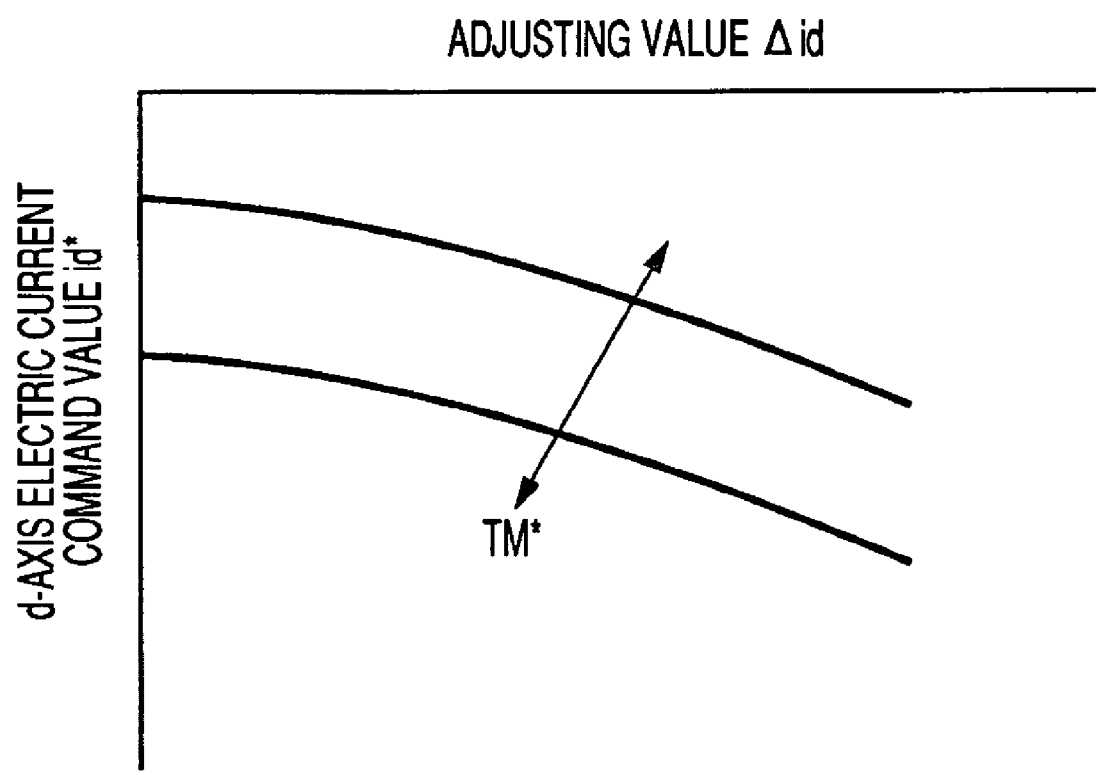
FIG. 12 is a view showing a second electric current command value map of the fourth embodiment of the present invention.

FIG. 11 is a block diagram of a drive motor controller of the fourth embodiment of the present invention. FIG. 12 is a second electric current command value map of the fourth embodiment of the present invention. In FIG. 12, the adjusting value Δiq is measured on the horizontal (x) axis, and the d-axis electric current command value id* is measured on the vertical (y).

In this case, the electric current command value calculating section 46 (as an electric current command value calculation processing means) has a q-axis electric current command value calculating section 73 and a subtracter 75 (as a first electric current command value calculation processing means), and a d-axis electric current command value calculating section 85 (as a second electric current command value calculation processing means) to perform electric current command value calculation processing. The q-axis electric current command value calculating section 73 and the subtracter 75 perform first electric current command value calculation processing, and calculate the q-axis electric current command value iq* (as a first electric current command value). The d-axis electric current command value calculating section 85 performs second electric current command value calculation processing, and calculates the d-axis electric current command value id* (as a second electric current command value). A maximum torque control processing means includes the q-axis electric current command value calculating section 73, and an electric current command value adjustment processing means includes the subtracter 75.

The q-axis electric current command value calculating section 73 performs maximum torque control processing, and reads the q-axis electric current command value iq*, corresponding to the drive motor target torque TM*, with reference to a first electric current command value map similar to that of FIG. 7 recorded in the memory. The q-axis electric current command value calculating section 73 then sends this q-axis electric current command value iq* to the subtracter 75.

The subtracter 75 performs electric current command value adjustment processing, and receives the adjusting value Δiq calculated similarly to the second embodiment. The subtracter 75 then adjusts the q-axis electric current command value iq* by subtracting the adjusting value Δiq from the q-axis electric current command value iq*, and sends the adjusted q-axis electric current command value iq* to the electric current control section 61.

In this case, when the adjusting value Δiq has a value of zero, the q-axis electric current command value iq* is not adjusted and the weak field control is not performed. In contrast to this, when the adjusting value Δiq has a positive value, the q-axis electric current command value iq* is decreased, and the weak field control is performed.

On the other hand, an unillustrated command value calculation processing means of the d-axis electric current command value calculating section 85 performs command value calculation processing, and reads the drive motor target torque TM*, limited by the torque command value limiting section 22, and the adjusting value Δiq. With reference to the second electric current command value map of FIG. 12 is recorded in the memory, the command value calculation processing means also reads the d-axis electric current command value id*, corresponding to the drive motor target torque TM*, and the adjusting value Δiq, and sends this d-axis electric current command value id* to the electric current control section 61.

In the second electric current command value map of FIG. 12, the d-axis electric current command value id* is increased (made less negative) as the adjusting value Δiq and the drive motor target torque TM* are reduced. The d-axis electric current command value id* is decreased (made more negative) as the adjusting value Δiq and the drive motor target torque TM* are increased.

In each of the embodiments, the d-axis electric current command value id* is calculated in the d-axis electric current command value calculating sections 53, 74, 85, and the q-axis electric current command value iq* is calculated in the q-axis electric current command value calculating sections 54, 73, 84. However, an electric current amplitude command value calculating section can be arranged as a first electric current command value calculation processing means, and an electric current phase command value calculating section can be arranged as a second electric current command value calculation processing means. After an electric current amplitude command value (as a first electric current command value) and an electric current phase command value (as a second electric current command value) are calculated, the d-axis electric current command value id* and the q-axis electric current command value iq* can be calculated.

Further, an electric current phase command value calculating section can be arranged as the first electric current command value calculation processing means, and an electric current amplitude command value calculating section can be arranged as the second electric current command value calculation processing means. After an electric current phase command value as the first electric current command value and an electric current amplitude command value as the second electric current command value are calculated, the d-axis electric current command value id* and the q-axis electric current command value iq* can be calculated.

Further, the driving case of the drive motor 31 is explained in each of the embodiments. However, the present invention can be applied to a case in which the electric generator is operated.

Although exemplary embodiments of the present invention have been described, it will be understood by one of skill in the art that the present invention is not limited to the described embodiments, but can be variously modified within the spirit and scope of the invention.

What is claimed is:

1. An electrically operated drive controller, comprising:
    first and second electric current command value calculation processing means for calculating first and second electric current command values, respectively, based on a target value of torque of an electrically operated machine;
    voltage command value calculation processing means for calculating a voltage command value based on said first and second electric current command values; and
    adjusting value calculation processing means for calculating an adjusting value of the first electric current command value to perform weak field control based on said voltage command value;
    wherein
    said first electric current command value calculation processing means calculates the first electric current command value on the basis of said adjusting value, and
    said second electric current command value calculation processing means calculates the second electric current command value on the basis of the first electric current command value calculated by said first electric current command value calculation processing means.

2. The electrically operated drive controller according to claim 1, wherein said first electric current command value calculation processing means includes:
    maximum torque control processing means for calculating the first electric current command value so as to minimize the absolute value of an electric current amplitude command value to achieve the target value of the torque of the electrically operated machine, and
    electric current command value adjustment processing means for adjusting the first electric current command value calculated by the maximum torque control processing means by the adjusting value.

3. The electrically operated drive controller according to claim 1, wherein said second electric current command value calculation processing means calculates the second electric current command value corresponding to said target value of an electrically operated machine torque and the first electric current command value.

4. The electrically operated drive controller according to claim 1, wherein said first and second electric current command values are a d-axis electric current command value and a q-axis electric current command value, respectively.

5. The electrically operated drive controller according to claim 1, wherein said first and second electric current command values are a q-axis electric current command value and a d-axis electric current command value, respectively.

6. The electrically operated drive controller according to claim 1, wherein said adjusting value calculation processing means calculates said adjusting value on the basis of a threshold value and a voltage saturation judging index calculated on the basis of said voltage command value and a voltage saturation judging index showing a degree of voltage saturation.

7. An electrically operated drive controller comprising:
    first and second electric current command value calculation processing means for calculating first and second electric current command values, respectively, based on a target value of torque of an electrically operated machine;
    voltage command value calculation processing means for calculating a voltage command value based on said first and second electric current command values; and
    adjusting value calculation processing means for calculating an adjusting value of the first electric current command value to perform weak field control based on said voltage command value;
    wherein:
    said first electric current command value calculation processing means includes:
        maximum torque control processing means for calculating the first electric current command value so as to minimize the absolute value of an electric current amplitude command value to achieve the electrically operated machine target torque, and
        electric current command value adjustment processing means for adjusting the first electric current command value calculated by the maximum torque control processing means by the adjusting value; and
    said second electric current command value calculation processing means calculates the second electric current command value corresponding to said target value of an electrically operated machine torque and the first electric current command value.

8. The electrically operated drive controller according to claim 7, wherein said first and second electric current command values are a d-axis electric current command value and a q-axis electric current command value, respectively.

9. The electrically operated drive controller according to claim 7, wherein said first and second electric current command values are a q-axis electric current command value and a d-axis electric current command value, respectively.

10. The electrically operated drive controller according to claim 7, wherein said adjusting value calculation processing means calculates said adjusting value on the basis of a threshold value and a voltage saturation judging index calculated on the basis of said voltage command value and a voltage saturation judging index showing a degree of voltage saturation.

11. An electrically operated drive control method comprising:
calculating first and second electric current command values based on a target value of torque of an electrically operated machine;
calculating a voltage command value based on said first and second electric current command values;
calculating an adjusting value of the first electric current command value to perform weak field control based on said voltage command value;
wherein:
the first electric current command value is calculated based on said adjusting value and
the second electric current command value is calculated based on said first electric current command value.

12. An electrically operated drive control method comprising:
calculating first and second electric current command values based on a target value of torque of an electrically operated machine;
calculating a voltage command value based on said first and second electric current command values;
calculating an adjusting value of the first electric current command value to perform weak field control based on said voltage command value;
wherein:
the first electric current command value is calculated based on said adjusting value and a maximum value of said target value of torque of an electrically operated machine, and
the second electric current command value is calculated based on said target value of an electrically operated machine and said adjusting value.

13. A computer readable medium having an electrically operated drive control program adapted to enable a computer to operate an electrically operated drive controller, the program enabling the computer to perform the steps of:
calculating first and second electric current command values based on a target value of torque of an electrically operated machine;
calculating a voltage command value based on said first and second electric current command values;
calculating an adjusting value of the first electric current command value to perform weak field control based on said voltage command value;
wherein:
the first electric current command value is calculated based on said adjusting value and
the second electric current command value is calculated based on said first electric current command value.

14. A computer readable medium having an electrically operated drive control program adapted to enable a computer to operate an electrically operated drive controller, the program enabling the computer to perform the steps of:
calculating first and second electric current command values based on a target value of torque of an electrically operated machine;
calculating a voltage command value based on said first and second electric current command values;
calculating an adjusting value of the first electric current command value to perform weak field control based on said voltage command value;
wherein:
the first electric current command value is calculated based on said adjusting value and
the second electric current command value is calculated based on said target value of torque of an electrically operated machine and said adjusting value.

* * * * *